United States Patent
Pei et al.

(10) Patent No.: US 9,419,968 B1
(45) Date of Patent: Aug. 16, 2016

(54) MOBILE PUSH USER AUTHENTICATION FOR NATIVE CLIENT BASED LOGON

(71) Applicant: Symantec Corporation, Mountain View, CA (US)

(72) Inventors: Mingliang Pei, Palo Alto, CA (US); Prashant Thakre, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/449,031

(22) Filed: Jul. 31, 2014

Related U.S. Application Data

(60) Provisional application No. 61/986,802, filed on Apr. 30, 2014.

(51) Int. Cl.
*H04L 29/06* (2006.01)
*G06F 21/31* (2013.01)

(52) U.S. Cl.
CPC ............ *H04L 63/0838* (2013.01); *G06F 21/31* (2013.01)

(58) Field of Classification Search
CPC .............................. G06F 21/31; H04L 63/083
USPC ............................................................ 726/7
See application file for complete search history.

(56) References Cited

U.S. PATENT DOCUMENTS

| | | | |
|---|---|---|---|
| 2007/0050635 A1* | 3/2007 | Popp | 713/185 |
| 2008/0103984 A1* | 5/2008 | Choe et al. | 705/76 |
| 2009/0193264 A1* | 7/2009 | Fedronic et al. | 713/184 |
| 2011/0289576 A1* | 11/2011 | Cheng | 726/9 |

OTHER PUBLICATIONS

Furtmueller, Florian G. "An Approach to Secure Mobile Enterprise Architectures." arXiv preprint arXiv:1304.0076 (2013).*
Hallsteinsen, Steffen, and Ivar Jorstad. "Using the mobile phone as a security token for unified authentication." Systems and Networks Communications, 2007. ICSNC 2007. Second International Conference on. IEEE, 2007.*
Janevski, Toni, et al. "AAA Solution for Interworking between Mobile Networks and Wireless LANs." Telecommunications, 2005. ConTEL 2005. Proceedings of the 8th International Conference on. vol. 1. IEEE, 2005.*

(Continued)

*Primary Examiner* — Syed Zaidi
(74) *Attorney, Agent, or Firm* — Wilmer Cutler Pickering Hale and Dorr LLP

(57) ABSTRACT

Mobile push user authentication for native client based logon is described. In one method, an authentication server receives from a user interface at a native client a password for native-client based logon to a remote server. The method determines whether a portion of the password includes a one-time password (OTP). When the password includes an OTP, the method validates the remaining portion of the password as a first authentication factor, and validates the OTP as a second authentication factor. When the password does not include an OTP, the method sends a mobile push notification to a registered device, validates the password as the first authentication factor, receives a response to the mobile push notification, and validates the response to the mobile push notification as the second authentication factor. The native-client based logon is authorized when the first authentication factor and the second authentication factor are validated.

20 Claims, 6 Drawing Sheets

(56) References Cited

OTHER PUBLICATIONS

Aloul, Fadi, Syed Zahidi, and Wassim El-Hajj. "Two factor authentication using mobile phones." Computer Systems and Applications, 2009. AICCSA 2009. IEEE/ACS International Conference on. IEEE, 2009.*

D. M'Raihi, M. Bellare, F. Hoornaert, D. Naccache, O. Ranen "HOTP: An HMAC-Based One-Time Password Algorithm", RFC 4226, Dec. 2005.*

* cited by examiner

MOBILE PUSH USER AUTHENTICATION FOR NATIVE CLIENT BASED LOGON

RELATED APPLICATION

This application claims the benefit of U.S. Provisional Application 61/986,802, filed on Apr. 30, 2014, which is hereby incorporated by reference in its entirety.

BACKGROUND

The need for strong user authentication for remote logon while at the same time maintaining a great user experience is increasing rapidly. One area in which this is particularly problematic is with native clients, such as virtual private network (VPN) clients. Native clients are especially challenging because, unlike web browser based logon where techniques may be used to detect passwords and interact with users, native clients have a rigid user interface and limit logon input fields to a username and a password without any detection capability. A problem arises when a user would like to receive a push notification instead of a one-time password (OTP) as a second-factor in two-step authentication. With only a username and password field at a logon screen of a native client, there has not been a clear way for a user to indicate his choice of receiving a push notification instead of using an OTP as a second method of authentication. Prior solutions have been non-intuitive and cumbersome for users to remember and implement.

SUMMARY

Methods for mobile push user authentication for native client based logon are described. A method may include receiving, by an authentication server from a user interface at a native client, a password for native-client based logon to a remote server. The user interface may include fields to receive a user name and the password and does not include a separate field to receive one-time passwords (OTPs) separately from the password. The method may also include determining whether a portion of the password includes an OTP, including the cases where the password itself looks like an OTP. When the password does include an OTP, the method may validate the remaining portion of the password as a first authentication factor, and validate the OTP as a second authentication factor. When the password does not include an OTP, the method may determine whether the user has a registered push device (e.g. user device 112), and when the user has a registered push device, send a mobile push notification to the registered devices. The method may then validate the password as the first authentication factor, receive a response to the mobile push notification, and validate the user response from the mobile push notification as the second authentication factor. When the user does not have a registered push device, the method may validate the password as the first authentication factor, challenge the client to send an OTP, and validate the OTP as a second authentication factor. The method may authorize the native-client based logon when the first authentication factor and the second authentication factor are validated.

In one embodiment, a password to a native client may be received. In one embodiment, the password may be received by a processor of an authentication server. The password may have been entered into a password field in a user interface of the native client. The user interface of the native client may include several other fields for user input that may include a field for a username. In one embodiment, the user interface does not have a separate field to separately receive a one-time password (OTP), separate from the password.

In one embodiment, after the password is received, the authentication server determines whether an OTP was included in the password field as a second authentication factor. In one embodiment, an OTP may be appended to the end of the password. In other embodiments, an OTP may be appended to the front of a password, or otherwise appended to the password. If the authentication server determines that an OTP was included in the password, the password may be validated, followed by validation of the OTP. The authentication server may perform the validation of the password and optionally may use an OTP/push validation service to validate the OTP. The OTP/push validation service is a validation service that may run on the authentication server or on a separate server.

In one embodiment, the authentication server may determine that a password that includes an OTP-like value might actually be part of the user's real password. In this case, the authentication server may attempt to validate the last N digits of the received password as an OTP before the password validation. If the OTP is successfully validated, the authentication server may perform the validation of the remaining password. If the OTP is not validated, the authentication server may send a push notification to user registered devices, and validate the user response to the push notification. If the push notification response is validated, the authentication server may validate the user password to complete two-factor authentication. In one embodiment, the OTP/push validation service may update a counter to indicate a bad second factor validation attempt when both the OTP validation and push response confirmation cannot be validated.

In one embodiment, the authentication server may send a push notification to a registered user device capable of receiving push notifications when the password does not include an OTP. In other embodiments, a text-message (via a short message service (SMS)) may be sent to a registered device. The authentication server may validate the password and receive a response to the push notification from the user device. In one embodiment, the response received by the authentication server may serve as a second authentication factor.

In one embodiment, the authentication server determines whether the user has any registered push devices, and when a user does not have a registered push device, validates the password as the first factor, and challenges an application server (e.g. VPN Gateway) for an OTP. The application server may further challenge the native client to prompt the user for an OTP. Upon receiving a subsequent OTP, the authentication server may validate the OTP as the second factor.

Upon successful validation of the password and second authentication factor, the authentication server may authorize the logon to the native client. In one embodiment, the authentication service records number of consecutive bad attempt and may stop sending push notification to the user when the number exceeds a threshold according to a lockout policy.

Further, a system for mobile push user authentication for native client based logon is described. An exemplary system may include a memory and a processor coupled to the memory. The processor is configured to receive a password from a user interface at a native client via a target application server such as VPN Gateway. The processor is also configured to determine whether a portion of the password includes an OTP. The processor is also configured to validate the remaining non-OTP portion of the password and the OTP portion of the password when an OTP was included in the password. When an OTP is not included in the password, the processor is configured to send a mobile push notification to a registered device, validate the password, receive a response to the mobile push notification, and validate the response to the mobile push notification. In one embodiment, the OTP validation and push response validation may be performed by separate processors. The processor is also configured to authorize the logon to the remote server when the first authentication factor (password) and the second authentication factor (OTP or response to push notification) are validated.

In addition, a non-transitory computer readable storage medium for mobile push user authentication for native client based logon is described. The non-transitory computer readable storage medium includes instructions that, when executed by a processor, cause the processor perform the operations described above. In addition, an apparatus comprising a memory device and a processor coupled to the memory device is described. The processor is to execute an OTP/push validation service. The OTP/push validation service is a validation service to perform the operations described above.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are methods for mobile push user authentication for native client based logon. In some embodiments, native client based logon may refer to user logon to a native VPN client. In other embodiments, the methods described herein may be used in other native applications and services, such as native social media applications and services and logon to a networked machine (e.g. a personal computer, tablet, or other mobile device).

In some embodiments, verification of a response to a mobile push notification is used as a second factor in two-factor authentication. Mobile push notifications may describe a style of internet-based communication where the request for a given transaction is initiated by a publisher or a central server. In one embodiment, authentication server 106 may initiate the push notification, delivering push notification via a standard push notification service 116 such as Google Cloud Message (GCM) and Apple Push Notification Service (APN). Authentication server 106 may implement various protocols when sending push notifications and waiting for responses including, but not limited to, HTTP server push, pushlet, and long polling. In one embodiment, users of a native client may register devices (e.g. mobile phones, tablets, personal computers) with authentication server 106. In one embodiment, registered devices may include a mobile application to receive and respond to push notifications to the authentication server instead of generating an OTP as a second authorization factor. In one embodiment, the application embeds a unique secure credential to prove the identity of the user and device. The application may read the push notification delivered from the push service, fetch actual push message content from the OTP/push validation service, and prompt the user to accept or reject the request. The application may then send the user approval to the OTP/push validation service with signed data using the embedded secure credential.

In various embodiments, push notifications may be sent to all or less than all of the user's registered devices. In other embodiments, authentication server 106 may send text messages (e.g., via SMS) or emails instead of, or in addition to, push notifications.

Figure 1:
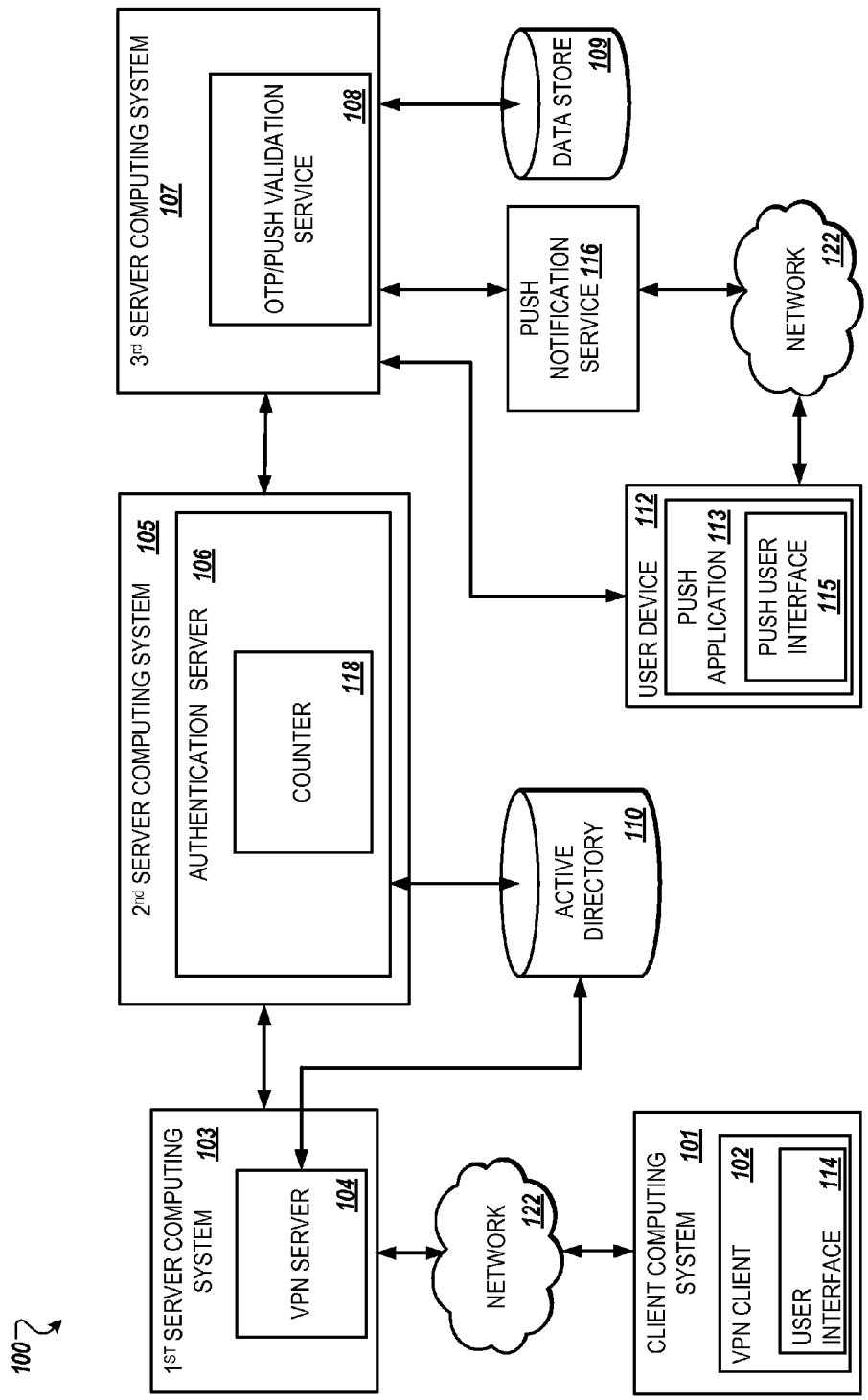
FIG. 1 illustrates an example system architecture in accordance with various implementations.

FIG. 1 illustrates example system architecture 100 in accordance with various implementations. System architecture 100 may include client computing system (hereinafter, client, client device) 101, VPN client 102, VPN client user interface 114, first server computing system 103, VPN server 104, second server computing system 105, authentication server 106, third server computing system 107, active directory 110, counter 118, OTP/push validation service 108, data store 109, push notification service 116, network 122, user device 112, push application 113, and push user interface 115. VPN server 104 is one example of an application server that may be used to interface with client computing system 101. Computing systems and devices described herein (e.g. 101, 103, 105, 112, 116) are each capable of communicating with one another via network 122. Network 122 may include, for example, private network such as a local area network (LAN), a wide area network (WAN), a global area network (GAN) such as the Internet, or a combination of such networks, and may include a wired or wireless network. Various networks described herein may be the same network or different networks altogether. The computing systems may be a personal computer, a tablet computer, a mobile phone such as a smart phone, a personal digital assistant (PDA), a portable media player, a netbook or the like. There can be any number of client computing systems in network architecture 100.

In one embodiment, VPN client 102 may be a native VPN client residing on a client computing system 101. A client may be a phone, laptop, tablet, workstation, or any other device one which a VPN client is may be accessed. VPN client 102 may include user interface 114 to allow a user to logon to a remote server (e.g. VPN server 104). User interface 114 may include various fields, in which a user may provide information relevant to the logon process. In one embodiment, user interface 114 may include a field for the user's username ("username field"), and a separate field for the user's password ("password field"). In one embodiment user interface 114 does not include a separate field where a user may enter an OTP. In other embodiments, user interface 114 does not include a field in which a user may indicate his preference of entering an OTP or receiving a push notification. In one embodiment user interface 114 includes only a username field and a password field. In one embodiment, the password field may be capable of receiving a password/OTP combination. For example, for the password "password" and the OTP "123456" the password field would be capable of receiving the input "password123456," "123456password," or any other combination of password and OTP.

In one embodiment, VPN server 104 is able to communicate with VPN client 102 and authentication server 106. In some embodiments, each of the servers 104 and 106 may each be a computing device (e.g., a server machine, a router, personal computer, etc.) that may provide at least some functionality related to user authentication. The servers 104 and 106 may be referred to as network resources. For example, the servers 104 and 106 may include, but are not limited to, a web server, an application server, a storage server, and a load balancing server. Servers 104 and 106 may be separate servers or may be the same server.

Second server computing system 105 may include one or more data stores (not shown). The data stores can be one or more centralized data repositories that store application data, system data, configuration data, or the like. The data stores may be local or remote data stores and may be single or multiple data structures (databases, repositories, files, etc.) residing on one or more mass storage devices, such as magnetic or optical storage based disks, tapes or hard drives. Active directory 110 may reside on VPN server 104, authentication server 106, or elsewhere as part of system architecture 100. Active Directory 110 is a directory service for Windows domain networks. In one embodiment, an active directory 110 domain controller authenticates and authorizes users and computers in a Windows domain type network—assigning and enforcing security policies for all computers and installing or updating software. In one embodiment, active directory 110 can make use of Lightweight Directory Access Protocol (LDAP). In other embodiments, other directory services may be used instead of active directory 110. In one embodiment, active directory 110 stores usernames and passwords. In other embodiments active directory 110 may store other information such as OTPs and a list of user devices 112. VPN server 104 and authentication server 106 may consult active directory 110 when validating passwords and OTPs, sending push notification to user device 112, and validating a response to a push notification. In other embodiments, OTP/push validation service 108 consult data store 109. Data store 109 may store information such as a list of user devices 112 and user configuration settings related to OTP and push verification.

System architecture may include counter 118. In one embodiment, counter 118 may be a "bad attempt" counter to implement a lock-out feature. In one embodiment, OTP/push validation service 108 may maintain counter 118. Such a counter may track the number of unsuccessful logon attempts during a predefined period of time. When the counter reaches a predefined number of bad attempts within the predefined period of time, a user attempting to logon may be locked out, or prevented from doing so, without some further action. In one embodiment a user may have to wait a predetermined amount of time before retrying to logon. In another embodiment, a user may have to call a phone number so that a system administrator may unlock the account. In one embodiment a corporate lockout protocol may lock a user out after a specified number of unsuccessful logon attempts (e.g. three unsuccessful attempts). Alternatively, other lockout policies can be used by the authentication server 106.

System architecture 100 may include OTP/push validation service 108. OTP/push validation service 108 is a validation service that may be implemented by third server computing system 107. In other embodiments, OTP/push validation service 108 may be implemented by authentication server 106, VPN server 104, or by any other network server or processor. In one embodiment, OTP/push validation service 108 is responsible for validating a user-provided OTP, and for sending push notifications to user device 112 and receiving responses from user device 112 through network 122. In one embodiment, OTP/push validation service 108 sends and receives responses to push notifications via push notification service 116 and network 122. In one embodiment, OTP/push validation service 108 consults active directory 110 during OTP validation. In other embodiments, OTP push validation service 108 may consult with data store 109 during OTP validation. The network 122 may be a public network (e.g., the Internet), a private network (e.g., a local area network (LAN) or a wide area network (WAN)), or a combination thereof. Network 122 may include a wireless infrastructure, which may be provided by one or multiple wireless communications systems, such as a Wi-Fi hotspot, connected with the network 122 and/or a wireless carrier system that may be implemented using various data processing equipment, communication towers, etc. User device 112 may be any device capable of connecting to OTP/push validation service 108 (e.g. phone, tablet, computer). In one embodiment, user device 112 belongs to a user attempting to logon to VPN client 102.

The user device 112 may include a push application 113 that is capable of receiving push notifications delivered to the user device 112. The push application 113 may include a push user interface 115 that interacts with the user to confirm or reject a login a request. In one embodiment, the push application 113 is able to authenticate itself with OTP/Push service 108 with an embedded unique security credential. In other embodiments, push application 113 can retrieve additional information from the OTP/push service 108, and securely send user action status to the OTP/Push service 108.

Figure 2:
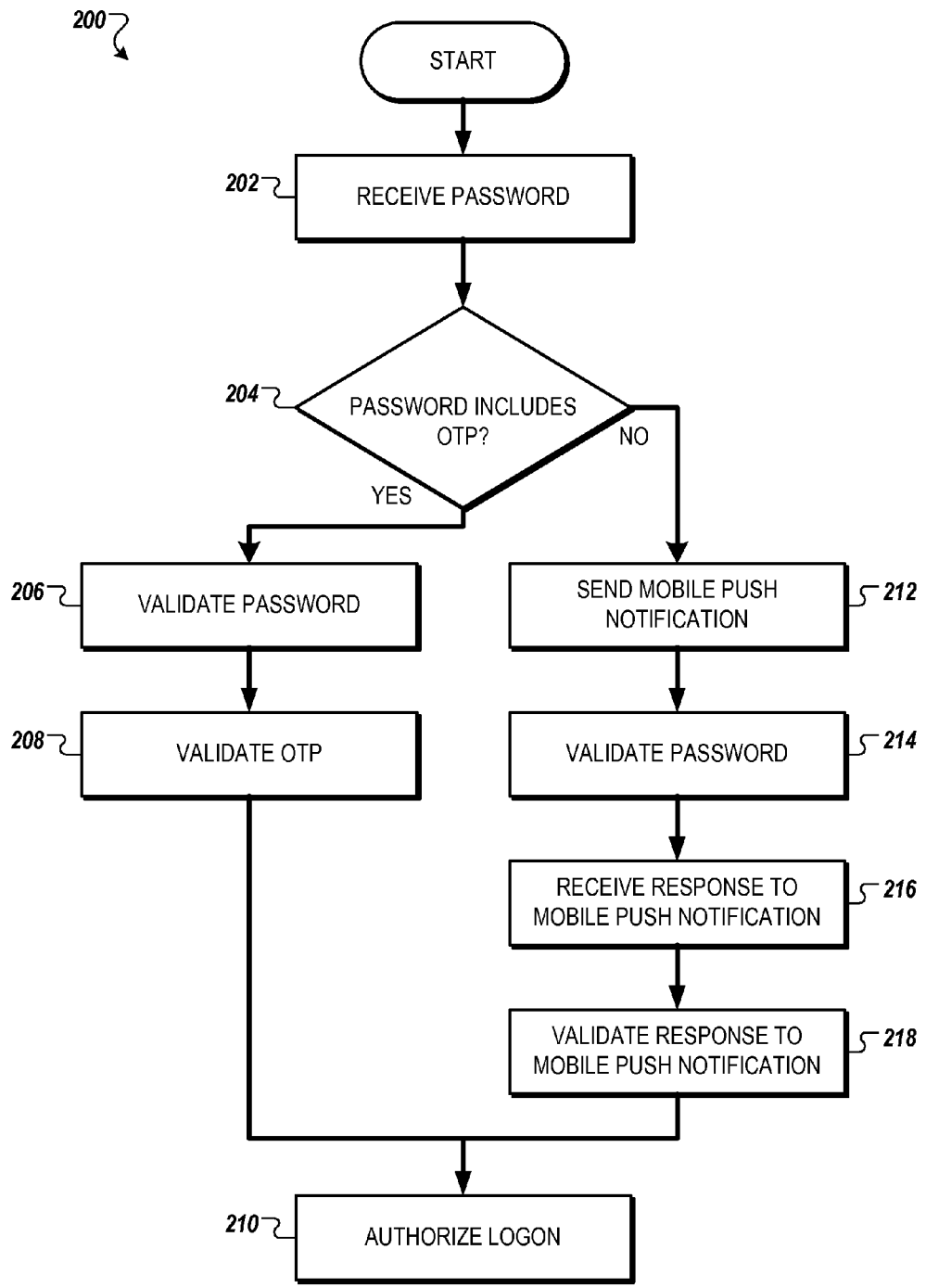
FIG. 2 is a flow diagram of a method for mobile push user authentication for native client based logon in accordance with some embodiments.

FIG. 2 is a flow diagram of a method for mobile push user authentication for native client based logon. The method 200 is performed by processing logic that comprises hardware (e.g., circuitry, dedicated logic, programmable logic, microcode, etc.), software (e.g., instructions run on a processor to perform hardware simulation), or a combination thereof. In one embodiment, authentication server 106 may perform method 200. In another embodiment, other components of the devices illustrated in FIG. 1 perform some or all of the operations. Method 200 may be performed in any order so as to fit the needs of the specific authorization to be accomplished.

At block 202, a password is received from a native client. In one embodiment, VPN server 104 initially receives the password and passes it along to authentication server 106. Once the password has been received, processing logic can determine whether or not the password includes an OTP at block 204. Methods for determining whether an OTP is included in the password are discussed below. If the processing logic determines that an OTP is included in the received password, flow continues to block 206 where processing logic validates the password. It should be noted that the received password may be an actual password or may be a composite of an actual password and an OTP. The composite password may include an OTP portion and a remaining portion that may be the actual password. In one embodiment, authentication server 106 instructs OTP/push validation service 108 to validate the password. In one embodiment, authentication server 106 (or OTP/push validation service 108) consults active directory 110 to determine whether the password is valid. In various embodiments, results of password and OTP validation attempts may be stored in active directory 110, authentication server 106, or elsewhere system 100. Once the password is validated, processing logic validates the OTP using OTP/push validation service 108 at block 208. OTP/push validation service may consult active directory 110 to determine whether the OTP is valid. In one embodiment, the password is validated before the OTP. In another embodiment, the OTP is validated before the password. If both the first factor (e.g., password) and second factor (e.g., OTP) are valid, processing logic authorizes the logon at block 210.

In one embodiment, if the processing logic determines that on OTP is not included in the password, flow continues to block 212 where authentication server 106 employs OTP/push validation service 108 to send a push notification requesting authorization to a registered user device 112. In one embodiment, OTP/push validation service 108 may send push notifications over network 122. Processing logic continues to validate the password at block 214 while waiting for a response to the push notification sent in block 212. In one embodiment, the password validation may happen before sending the push notification according to a configuration choice. At block 216, authentication server 106 receives a response to the push notification sent in block 212. In one embodiment, OTP/push validation service 108 receives the response to the push notification through network 122. OTP/push validation service 108 validates the push notification response at block 218 after it has been received. Upon successful validation of the response to the push notification (and password at block 214), the processing logic authorizes the client logon at block 210. In one embodiment, users are able to opt out of receiving push notifications. In this case, the processing logic may validate an OTP instead of a push notification response. In one embodiment, users may not have a registered device (e.g. user device 112) and an OTP isn't sent. In this case, the processing logic may challenge the user to submit an OTP after password validation (block 500).

Figure 3:
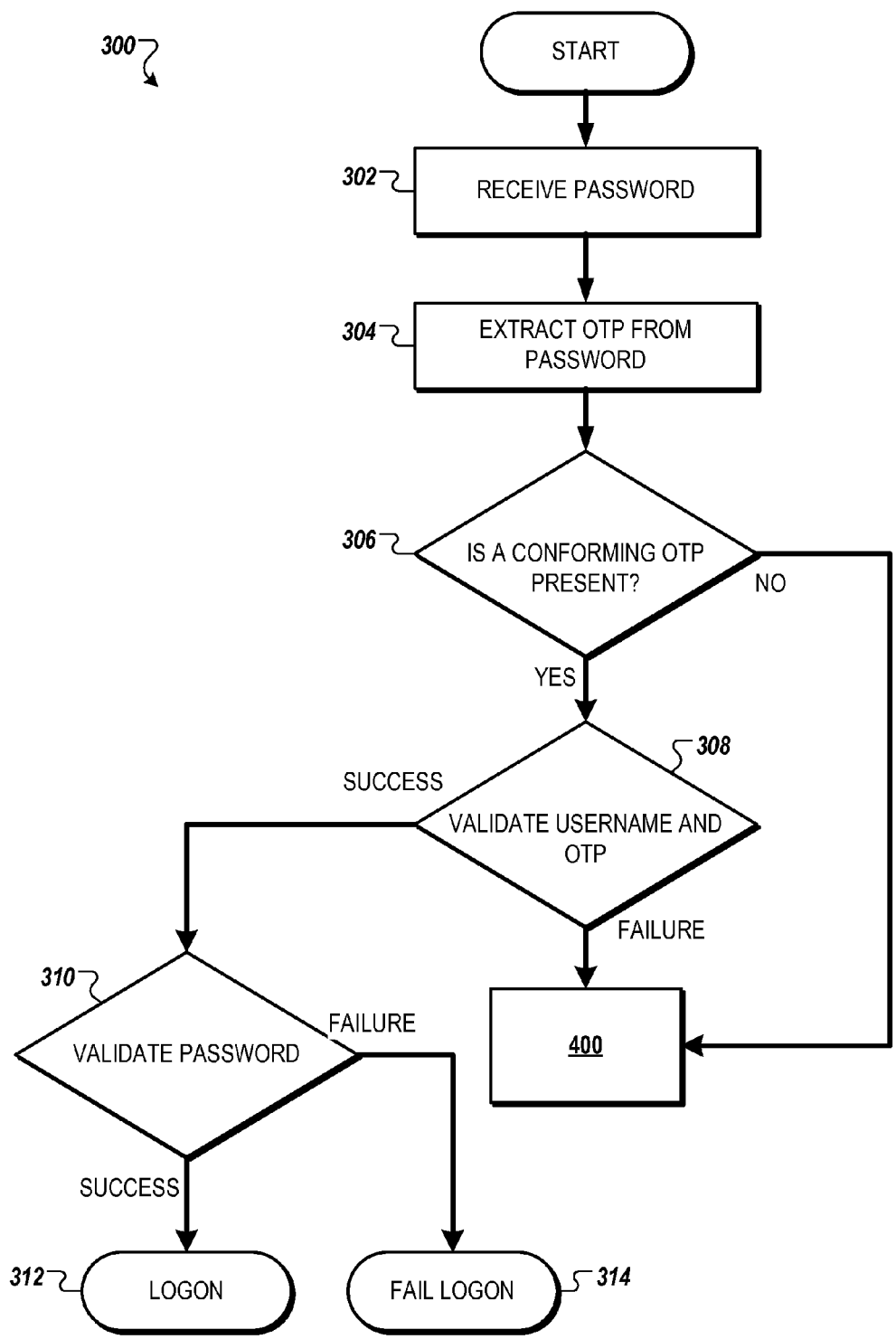
FIG. 3 is a flow diagram of a first part of a method for mobile push user authentication for native client based logon in accordance with some embodiments.

FIG. 3 is a flow diagram of a first part of a method for mobile push user authentication for native client based logon. The method 300 is performed by processing logic that comprises hardware (e.g., circuitry, dedicated logic, programmable logic, microcode, etc.), software (e.g., instructions run on a processor to perform hardware simulation), or a combination thereof. In one embodiment, authentication server 106 may perform method 300. In another embodiment, other components of the devices illustrated in FIG. 1 perform some or all of the operations. Method 300 may be performed in any order so as to fit the needs of the specific authorization to be accomplished.

At block 302, a password is received by authentication server 106. In one embodiment, the password is received from a native VPN client 102 via VPN server 104. Once the password has been received, processing logic may extract an OTP from the password at block 304. In one embodiment, the processing logic may extract the OTP from the password by truncating a predefined number of characters/digits from the password. In one embodiment, the predefined number of characters/digits may be the OTP portion of the received password. For example, if the OTP size should be 6 characters in length, authentication server 106 may treat the last 6 characters of the password as the OTP portion, whether or not the last 6 characters are an actual OTP. In one embodiment, processing logic may determine whether a predetermined number of characters in the password are digits. In one embodiment, if the predetermined number of characters is not digits, processing logic may determine that the password does not include an OTP. In another embodiment, processing logic may treat the first 6 characters of the password as the OTP. In other embodiments, various other factors may be used to determine which characters are likely to be an OTP.

In some cases, user password input may be a long numeric password (e.g. Pa$s0123456789) that may be wrongfully treated as a password/OTP combination when the user intends to use push confirmation as the second factor. In this case, the authentication server 106 may attempt to validate the OTP portion first (block 308) with the OTP/push validation service 108. If the detected OTP portion is actually part of the password, OTP validation may fail. In this case, the OTP/push validation service 108 may send a push notification to detected registered push devices (e.g. user device 112). If the user accepts the push request at the user device 112, authentication server 106 may treat the entire password input as the first factor for password validation. Otherwise, the authentication server may send authentication failure to client 102.

In one embodiment, OTP false positive detection from a received password may be handled by using a cached password anomaly flag that indicates whether the user has entered an OTP-like password. The first time an OTP-like password is received, the above OTP false positive authentication flow may be used. When the entire OTP-like password input is determined to be the user's password, the authenticate server 106 may record a flag to indicate that the user has an OTP-like password along with the last confirmation timestamp. The flag allows the authenticate server to avoid additional OTP false positive validation when a subsequent request is received within a threshold time window before another full OTP first validation flow may be carried out. When a subsequent login from the same user is received, the authentication server may check the password anomaly status records to determine whether the user has an OTP-like long password and if so, directly carry out full password local validation and push notification validation. This can be used to control push spam to the user in case an adversary enters a random OTP-like password in the name of the user. In one embodiment, this flag may be saved in the authentication server 106 or in the third server 107.

Once the OTP has been extracted, processing logic may determine whether or not the extracted OTP conforms to OTP and password protocol at block 306. In one embodiment, the protocol may be a corporate one, enforced by the native VPN client 102 and VPN server 104. In other embodiments, the protocol may be internal to authentication server 106. OTP protocol may dictate that the OTP must be pure numerical digits, pure alphabetical characters, or a combination of both. In one embodiment, processing logic may also determine whether or not the password as a whole conforms to password protocol. For example, if the password protocol is that a password must be at least six characters in length, and an OTP must be at least six characters in length, any password/OTP combination input by a user into user interface 114 at VPN client 102 must therefore be at least twelve characters in length (minimum password length requirement plus minimum OTP length requirement). If processing logic determines that the password input by a user is only eight characters in length, processing logic may effectively determine that a valid OTP was not input by a user at VPN client 102, even if the password ends with all OTP like digits (e.g. Pa$s012345678).

If an OTP (or password/OTP combination) does not conform to the required OTP and password protocols at block 306, flow continues to block 400 which will be discussed in detail with respect to FIG. 4.

If the OTP (and/or password/OTP combination) conforms to OTP and password protocol at block 306, flow continues to block 308 where processing logic may validate the input username and OTP. In one embodiment, authentication server 106 validates the username and OTP using OTP/push validation service 108. OTP/push validation service 108 may verify that the input OTP is in fact a valid OTP and it correctly corresponds to the input username. If OTP/push validation service 108 cannot verify the username and OTP, flow continues to block 400.

If OTP service 108 validates the username and OTP, flow continues to block 310 where processing logic attempts to validate the password portion of the input password/OTP combination. In one embodiment, processing logic attempts to validate the password by referencing active directory 110. If the processing logic successfully validates the password it authorizes client logon at block 312. If the processing logic is unsuccessful in its attempt to validate the password, however, authentication server 106 fails the client logon at block 314.

Figure 4:
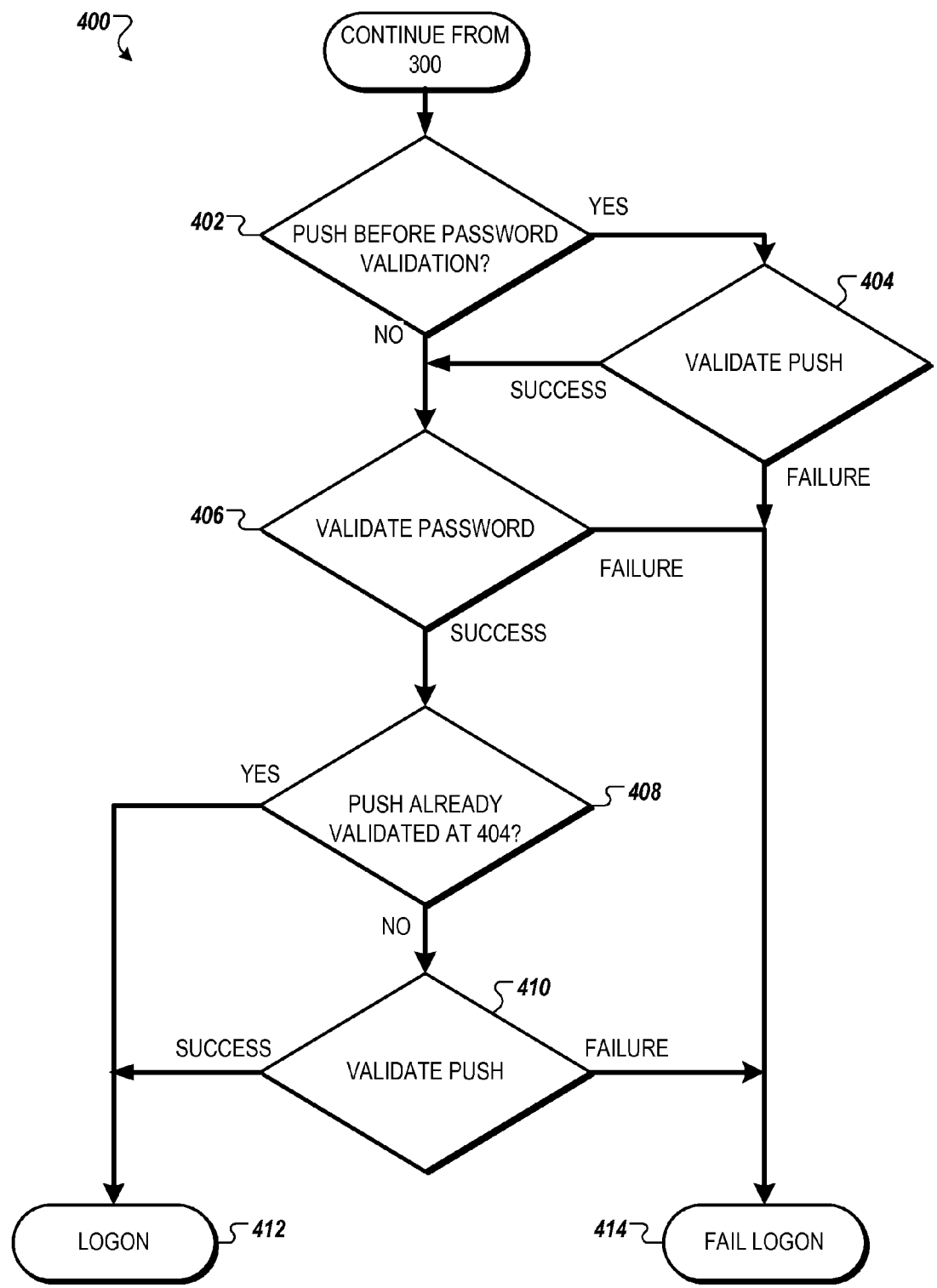
FIG. 4 is a flow diagram of a second part of a method for mobile push user authentication for native client based logon in accordance with some embodiments.

FIG. 4 is a flow diagram of a second part of a method for mobile push user authentication for native client based logon. The method 400 is performed by processing logic that comprises hardware (e.g., circuitry, dedicated logic, programmable logic, microcode, etc.), software (e.g., instructions run on a processor to perform hardware simulation), or a combination thereof. In one embodiment, authentication server 106 may perform method 400. In another embodiment, other components of the devices illustrated in FIG. 1 perform some or all of the operations. Method 400 may be performed in any order so as to fit the needs of the specific authorization to be accomplished. Method 400 may be a continuation of method 300 when OTP syntax does not conform to protocol at block 306 or a username and OTP cannot be validated at block 308.

Processing logic may attempt to validate a response to a push notification either before or after it attempts to validate a password. In one embodiment, the order in which processing logic attempts to validate an OTP and password is determined by corporate protocol. In another embodiment, processing logic determines the order in which to attempt validation of an OTP and password. Processing logic may use factors such as corporate and internal policies and server load requirements when determining validation order. At block 402, processing logic determines whether a push response should be validated before password validation. If so, the processing logic sends a push message and waits for a response at block 404. In one embodiment, OTP/push validation service 108 sends the push notification and waits for a response. In one embodiment, OTP/push validation service 108 looks in data store 109 for a registered device belonging to the user trying to logon. A push message may be send to the registered device asking the user to verify that he or she is attempting to logon. In some embodiments, more than one user device may be registered. In this case, processing logic may determine to which devices a push notification should be sent. The push notification may be sent to one or a group of the user's registered devices. Once the push notification is sent, OTP/push validation service 108 waits for a response to the notification. A response may time out or otherwise be invalidated for several reasons. A user may not have the device with him, may accidentally decline the authorization, or may decline the authorization because he or she is not the one requesting logon permission. Whatever the case, if the push response is invalidated, processing logic fails to authorize the logon at block 414.

In one embodiment, if the push response is valid, flow continues to block 406 where processing logic attempts to validate the password. If the password is invalidated, the logon fails at block 414. If the password is validated at block 406, processing logic determines where a push response was already validated in block 404. If so, processing logic authorizes the logon at block 412. If a push response was not already validated, processing logic attempts to do so at block 410. If processing logic successfully validates the push response, logon is permitted at block 412. If processing logic invalidates the push response at block 410, logon is not authorizes at block 414.

Figure 5:
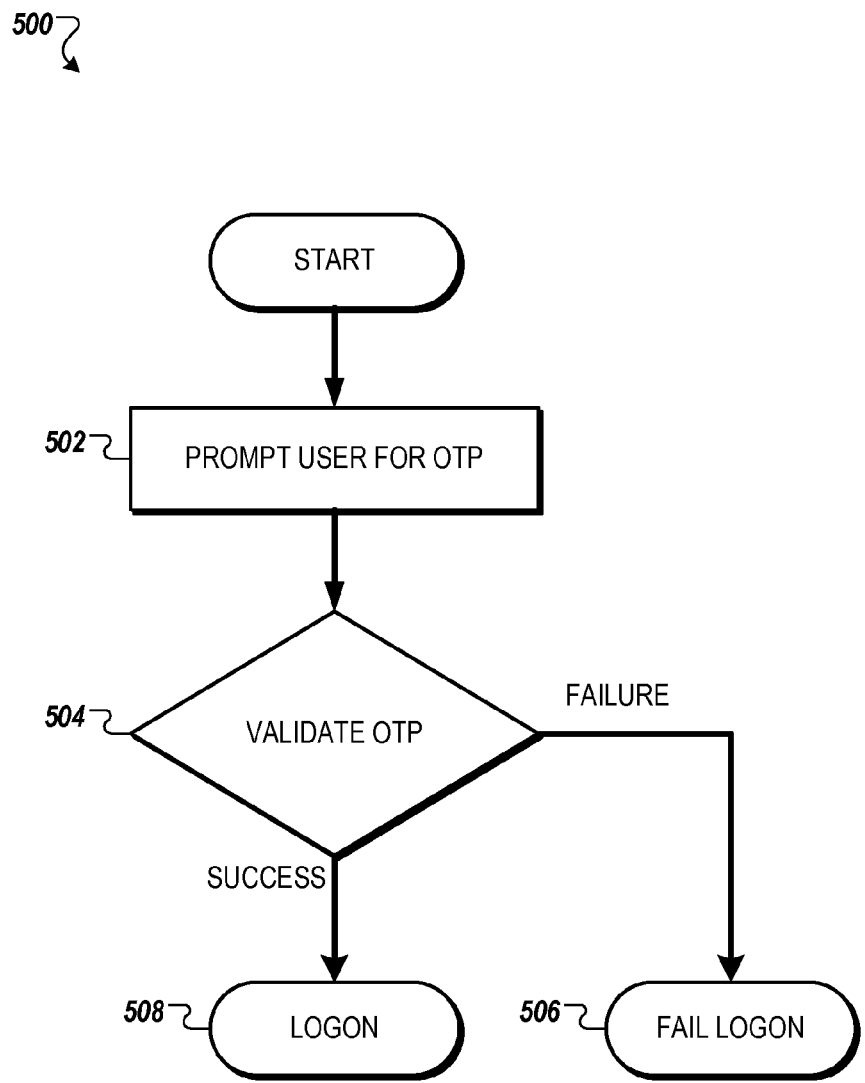
FIG. 5 is a flow diagram of a method for validating an OTP after a push notification verification failure or when push notification is not enabled in accordance with some embodiments.

FIG. 5 is a flow diagram of a method for validating an OTP after a push notification verification failure or when push notification is not enabled. The method 500 is performed by processing logic that comprises hardware (e.g., circuitry, dedicated logic, programmable logic, microcode, etc.), software (e.g., instructions run on a processor to perform hardware simulation), or a combination thereof. In one embodiment, authentication server 106 may perform method 500. In another embodiment, other components of the devices illustrated in FIG. 1 perform some or all of the operations. Method 500 may be performed in any order so as to fit the needs of the specific authorization to be accomplished.

In some cases it may be useful to prompt a user for an OTP after some time interval has passed without receiving a push notification response (also referred to herein as response time-out) or after a previously entered OTP has been invalidated. In this case, a second logon screen may be presented to the user via the user interface 114 at native VPN client 102. In this second logon screen, the user may be prompted for an OTP at block 502. At block 502, processing logic may attempt to validate the OTP. In one embodiment, OTP/push validation service 108 may determine whether the user has entered a valid OTP. If OTP/push validation service 108 is able to validate the OTP, logon is permitted at block 508. If processing logic is unable to validate the OTP, logon is failed at block 506.

As is the case with all methods described herein, processing logic may prevent counter 118 from being incremented when a password or an OTP is invalidated. Methods 200, 300, 400, and 500 as described are but one of many possible implementations of the authorization methods described herein. Other solutions exist for providing authorization in specific cases. For example, in the case where second factor validation (OTP or push) must be completed before first factor validation (password), either a valid OTP from the password input or a registered push device (e.g. user device 112) for the user is required and validated first. When a detected OTP value cannot be validated, the OTP bad attempt may not increment counter 118 until a push notification response is invalidated. If an OTP is missing or when push notification is not enabled for the user (e.g. the user has not configured authentication via push or the user does not have a registered push device), the authentication server may challenge the client to provide an OTP in another screen (e.g. method 500). In one embodiment, this may be achieved by Access-Challenge mode supported by a VPN gateway server that uses Radius protocol for authentication.

In another example, in the case where first-factor (password) validation must be completed before second-factor (OTP or push) validation, the password may be validated at authentication server 106 first if the given password input does not include an OTP. If an OTP-like pattern is found in the password, OTP validation may be handled first to avoid a false password validation attempt. In one embodiment, processing logic may perform one password check with the truncated password against active directory 110 without incrementing counter 118. If the truncated password is validated, processing logic may perform the standard OTP validation and a reset counter 118. If the truncated password cannot be validated, the authentication server 106 may now treat the entire password input as the first factor, and processing logic may perform password with push notification flow as described above.

Figure 6:
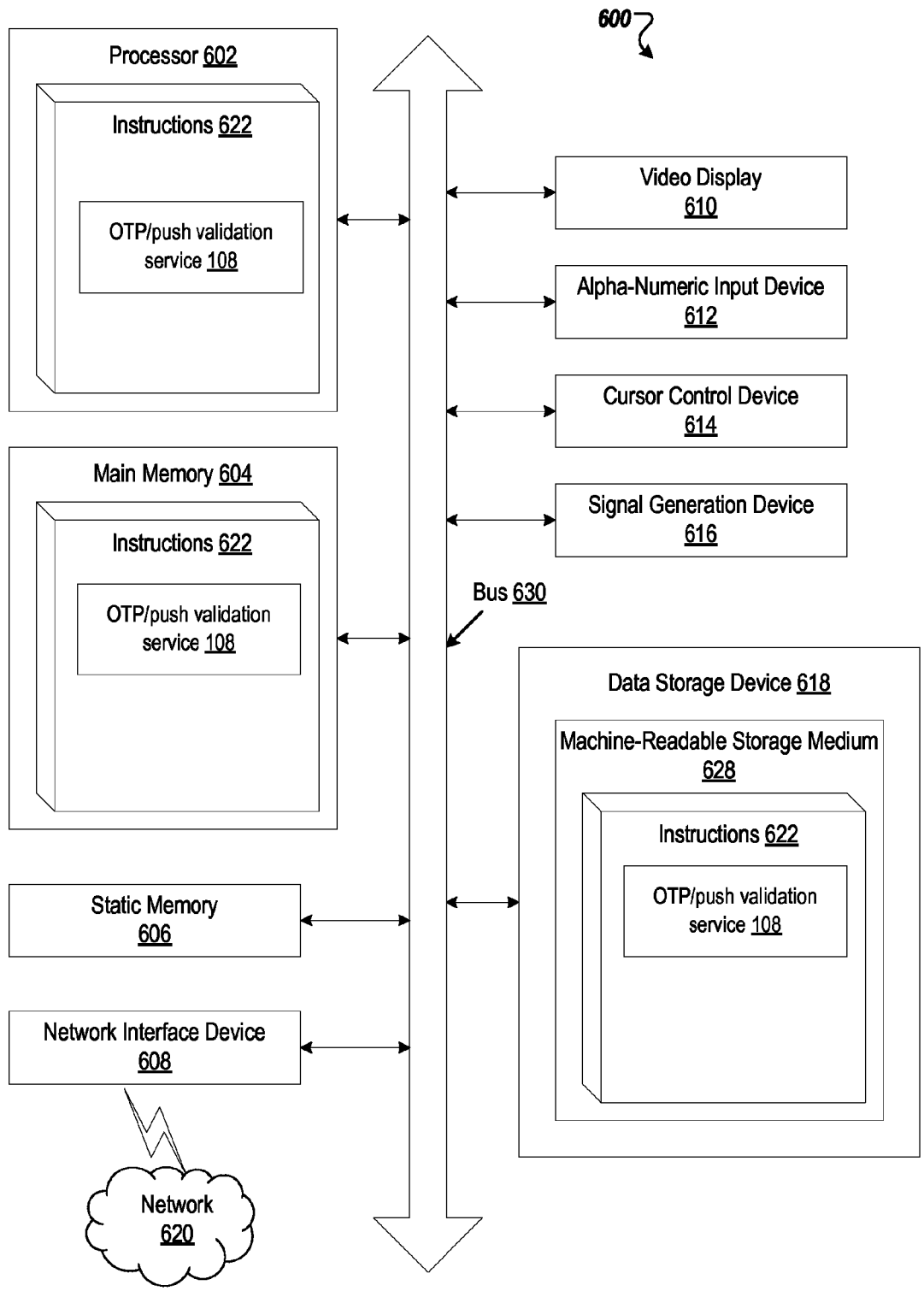
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processor 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processor 602 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 602 may also be one or more special-purpose processors such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting machine-readable storage media.

In one implementation, the instructions 622 include instructions for an OTP/push validation service (e.g., OTP/push validation service 108 of FIG. 1 and/or a software library containing methods that call modules or sub-modules in an OTP/push validation service. While the machine-readable storage medium 628 is shown in an example implementation to be a single medium, the term "non-transitory computer-readable storage medium" or "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processor of an authentication server, from a user interface at a native client, a password for native-client based logon to a remote server, wherein the user interface includes fields to receive a user name and the password and does not include a separate field to receive one-time passwords (OTPs) separately from the password;
determining, by the processor, whether a portion of the password comprises an OTP;
when the password comprises the OTP,
validating a remaining portion of the password as a first authentication factor, and
validating the OTP as a second authentication factor;
when the password does not comprise the OTP,
sending a mobile push notification to a registered device,
validating the password as the first authentication factor,
receiving a response to the mobile push notification, and
validating the response to the mobile push notification as the second authentication factor;
authorizing the native-client based logon when the first authentication factor and the second authentication factor are validated; and
providing a prompt to input an OTP for the second authentication factor when the response to the push notification is not validated within a time interval.

2. The method of claim 1, wherein the native client is a virtual private network (VPN) client comprising the user interface, and wherein receiving the password comprises receiving the password from one of the fields in the user interface.

3. The method of claim 1, wherein determining whether the password comprises the OTP comprises:
determining whether a predetermined number of characters in the password are digits, wherein the predetermined number of characters is defined by an OTP size used by the authentication server for validating the OTPs; and
when the predetermined number or characters are digits, validating the digits as a valid OTP.

4. The method of claim 3, further comprising maintaining a counter, wherein the counter tracks a number of unsuccessful logon attempts for a lock-out feature, and when the digits are invalidated as the valid OTP, preventing the counter from being incremented.

5. The method of claim 4, further comprising preventing the counter from being incremented after invalidating the password against a predetermined password protocol.

6. The method of claim 3, further comprising enabling a flag when the password comprises a value similar to the OTP.

7. The method of claim 1, further comprising displaying a second logon screen to provide the prompt to input an OTP for the second authentication factor when the response to the push notification is not validated within a time interval.

8. The method of claim 1, further comprising determining whether a length of the password is greater than a minimum password length requirement plus a minimum OTP length requirement.

9. The method of claim 1, wherein the OTP portion of the password is at an end of the received password.

10. A apparatus comprising:
a memory device; and
a processor coupled to the memory device, wherein the processor is to execute a validation service, the validation service to:
receive, from a user interface of a native client, a password for native-client based logon to a remote server, wherein the user interface includes fields to receive a user name and the password and does not include a separate field to receive one-time passwords (OTPs) separately from the password;
determine whether a portion of the password comprises an OTP;
when the password comprises the OTP,
validate a remaining portion of the password as a first authentication factor, and
validate the OTP as a second authentication factor;
when the password does not comprise the OTP,
send a mobile push notification to a registered device,
validate the password as the first authentication factor,
receive a response to the mobile push notification, and
validate the response from the mobile push notification as the second authentication factor; and
authorize the native-client based logon when the first authentication factor and the second authentication factor are validated; and
provide a prompt to input an OTP for the second authentication factor when the response to the push notification is not validated within a time interval.

11. The apparatus of claim 10, wherein the native client is a virtual private network (VPN) client comprising the user interface, and wherein receiving the password comprises receiving the password from one of the fields in the user interface.

12. The apparatus of claim 10, wherein the validation service is further to:
determine whether a predetermined number of characters in the password are digits, wherein the predetermined number of characters is defined by an OTP size used by the validation service; and
when the predetermined number or characters are digits, validate the digits as a valid OTP.

13. The apparatus of claim 12, wherein the validation service is further to maintain a counter, wherein the counter is to track a number of unsuccessful logon attempts for a lock-out feature, and when the digits are invalidated as a valid OTP, prevent the counter from being incremented.

14. The apparatus of claim 13, wherein the validation service is further to prevent the counter from being incremented after invalidating the password against a predetermined password protocol.

15. The apparatus of claim 10, wherein the validation service is further to display a second logon screen to provide the prompt to input an OTP for the second authentication factor when the response to the push notification is not validated within a time interval.

16. A non-transitory computer readable storage medium including instructions that, when executed by a processor, cause the processor to perform operations comprising:
- receiving, by the processor from a user interface at a native client, a password for native-client based logon to a remote server, wherein the user interface includes fields to receive a user name and the password and does not include a separate field to receive one-time passwords (OTPs) separately from the password;
- determining, by the processor, whether a portion of the password comprises an OTP;
- when the password comprises the OTP,
  - validating a remaining portion of the password as a first authentication factor, and
  - validating the OTP as a second authentication factor;
- when the password does not comprise the OTP,
  - sending a mobile push notification to a registered device,
  - validating the password as the first authentication factor,
  - receiving a response to the mobile push notification, and
  - validating the response from the mobile push notification as the second authentication factor;
- authorizing, by the processor, the native-client based logon when the first authentication factor and the second authentication factor are validated; and
- providing a prompt to input an OTP for the second authentication factor when the response to the push notification is not validated within a time interval.

17. The non-transitory computer readable storage medium of claim 16, wherein the native client is a virtual private network (VPN) client comprising the user interface, and wherein receiving the password comprises receiving the password from an input field (of the fields) in the user interface of the native VPN client.

18. The non-transitory computer readable storage medium of claim 16, wherein determining whether the password comprises the OTP comprises:
- determining whether a predetermined number of characters in the password are digits, wherein the predetermined number of characters is defined by an OTP size used by the validation service; and
- when the predetermined number or characters are digits, validating the digits as a valid OTP.

19. The non-transitory computer readable storage medium of claim 18, further comprising maintaining a counter, wherein the counter tracks a number of unsuccessful logon attempts for a lock-out feature, and when the digits are invalidated as a valid OTP, preventing the counter from being incremented.

20. The non-transitory computer readable storage medium of claim 16, further comprising displaying a second logon screen to provide the prompt to input an OTP for the second authentication factor when the response to the push notification is not validated within a time interval.

* * * * *